United States Patent Office 2,759,673
Patented Aug. 21, 1956

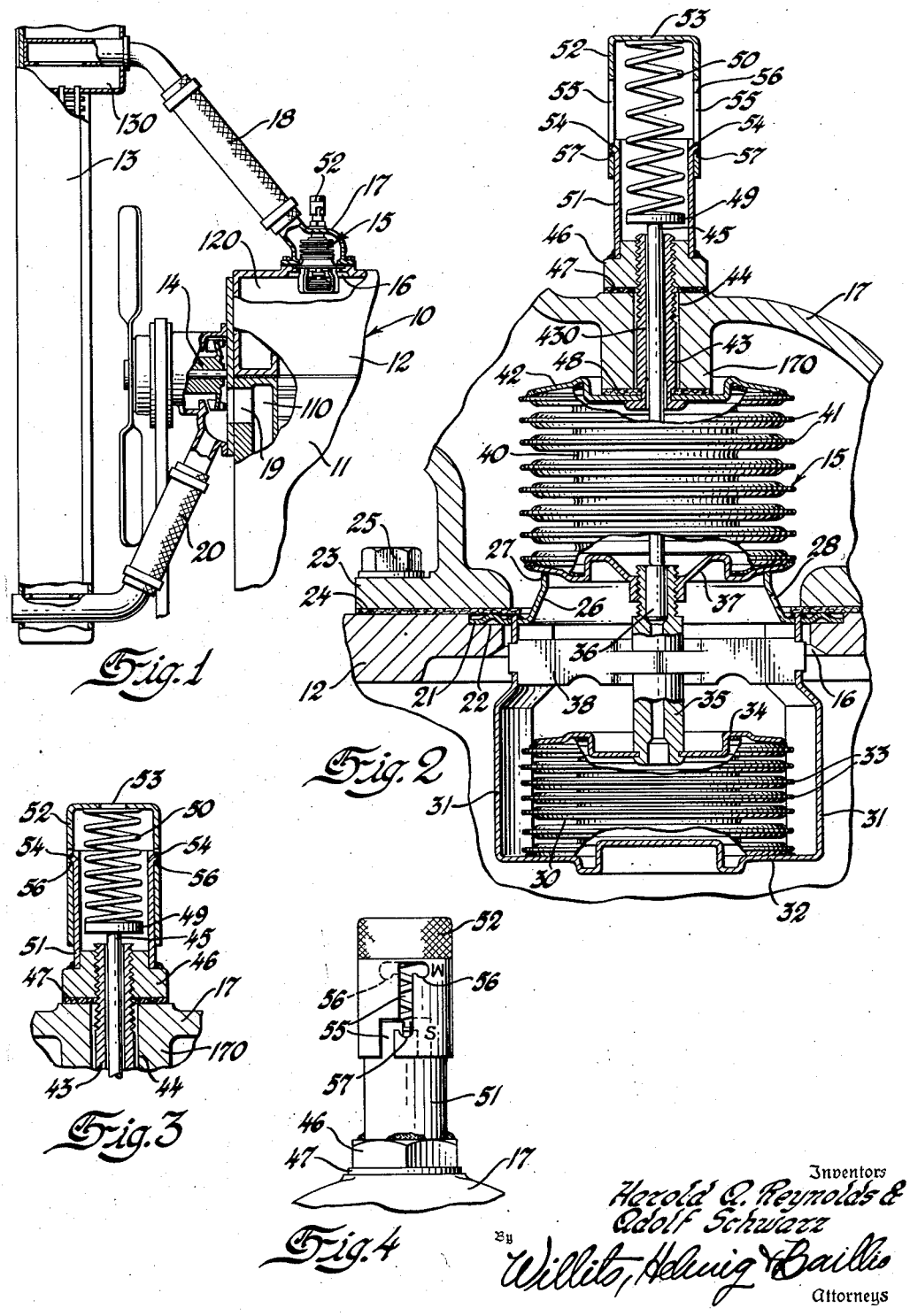

2,759,673

THERMOSTATIC VALVES

Harold A. Reynolds and Adolf Schwarz, Lockport, N. Y., assignors to General Motors Corporation, Detroit, Mich., a corporation of Delaware Application October 26, 1951, Serial No. 253,352

5 Claims. (Cl. 236—34)

This invention relates to thermostatic valves of the type employed to control coolant temperatures in liquid cooled internal combustion engines such as automobile engines.

Although not limited to use in automobile engine cooling systems, the invention may best be illustrated in connection with an automotive engine cooling system. Generally, in automobile engine cooling systems, two major objects must be accomplished; first, to provide rapid engine warm-up, and second, to maintain the engine at the temperature that will produce the most efficient and economical operation of the engine. In addition, in the modern passenger automobile, winter driving comfort is usually attained by the use of a hot water space heater connected to the engine cooling system which heats the passenger compartment of the automobile. During mild weather when the heater is not in use, a relatively low temperature opening thermostat is generally employed to accomplish rapid engine warm-up and to maintain the engine at efficient operating temperature. However, during cold weather, a relatively high temperature opening thermostat is preferable to provide relatively high coolant temperatures to attain maximum heater efficiency.

In some automobiles, the cooling system is operated under pressure to increase the temperature at which the coolant will boil. This is accomplished by a pressure radiator cap having a pressure relief valve set, for example, to open at 3½ to 4½ p. s. i. which raises the boiling point of water in the cooling system to between 222 to 225 degrees F. When the engine is stopped and the coolant temperature drops, a vacuum is created in the pressure cooling system which is relieved by a suitable vacuum relief valve built into the pressure radiator cap.

In pressure type engine cooling systems, a compensated thermostat is generally preferable which consists of a valve operated by a bellows coupled with a compensating bellows vented to atmosphere. The compensated type bellows thermostat has the characteristics of having a definite start-to-open temperature and a definite control temperature, both unaffected by changes in pressures in the cooling system. However, the uncompensated type thermostat has definite advantages over the compensated type thermostat when operating in a pressurized cooling system in conjunction with a car heater in cold weather. During the initial stages of a car heating cycle having a pressurized engine cooling system, after a cold engine start in cold weather when high output of the heater is extremely desirable, the coolant temperature in the engine cooling system equipped with the uncompensated thermostat exceeds that of a like engine cooling system equipped with a compensated thermostat by approximately 3 degrees F. for each p. s. i. of pressure in the system, and thereby provides correspondingly higher heater performance.

Although advantageous as far as heater performance is concerned, the fact that an uncompensated thermostat operates at higher temperatures in pressurized engine cooling systems than the compensated type thermostat makes the uncompensated thermostat distinctly undesirable when used in cooling systems of engines where and when detonation is a critical problem, as in warm weather operation.

In an unpressurized cooling system, the invention may be employed to provide an uncompensated thermostatic valve operable at more than one start-to-open temperature whereby to accommodate a single thermostatic valve to both winter and summer engine operating conditions, thus eliminating the generally used practice of changing thermostatic valves in the cooling system from a relatively low temperature start-to-open thermostatic valve for summer driving to a relatively high temperature start-to-open thermostatic valve for winter driving.

With the foregoing in view, it is an object of this invention to provide a thermostatic valve having more than one start-to-open characteristic selectable responsive to simple inexpensive manual control whereby to permit a single thermostatic valve to be usable advantageously in both pressurized and unpressurized internal combustion cooling systems to control summer and winter engine operation temperatures and meet car heater requirements.

Another object of this invention is to provide a fully compensated thermostat for summer or warm weather engine operation and an uncompensated thermostat for winter or cold weather engine operation, all in a single, simply constructed, economical and efficient unit readily set from summer to winter operation or vice versa.

Another object of the invention is to provide a thermostatic valve for unpressurized cooling systems having a plurality of start-to-open operating temperatures selectively controlled by simple, inexpensive and positive means.

Other objects of the invention will become obvious by reference to the following detailed description taken in connection with the accompanying drawing in which:

Fig. 1 is a more or less diagrammatic view of a liquid cooling system of an internal combustion engine incorporating a thermostatic valve embodying the invention.

Fig. 2 is an enlarged sectional view of a thermostatic valve embodying the invention shown installed in the water outlet from the engine cylinder head and with the adjusting cap thereof in "Summer" position.

Fig. 3 is a fragmentary sectional view showing the adjusting cap in "Winter" position.

Fig. 4 is a fragmentary elevational view showing the adjusting cap in a "Summer" position.

Referring now to the drawings wherein like numerals refer to like and corresponding parts throughout the several views, Fig. 1 shows a fragmentary view of an internal combustion engine 10 with coolant passages 110 and 120 in the block 11 and head 12 respectively thereof. The cooling system generally comprises a radiator 13 from which coolant is pumped to and through the coolant passages 110 and 120 of the engine 10 by means of a coolant pump 14 under control of a thermostatic valve 15 generally located at the coolant outlet 16 in the top of the cylinder head 12 in the coolant outlet fitting 17. Connection from the engine coolant outlet fitting 17 to the radiator 13 is accomplished by a hose 18 and connection from the radiator 13 to the pump 14 and engine water inlet 19 is accomplished by a hose 20. When the thermostatic valve 15 is closed, no coolant passes through the radiator 13; thus, when the engine is cold, a rapid warm-up period exists until the coolant at the water outlet 16 becomes sufficiently hot to cause the thermostatic valve 15 to open. In some engine cooling systems the cooling system is pressurized by employing a pressure cap generally set at 3½ to 4½ p. s. i. on the radiator filler spout of the radiator tank 130; however, inasmuch as the pressure cap per se is not a part of this invention, it has not been shown and described.

Referring now particularly to Figs. 2, 3 and 4, the thermostatic valve 15 illustrative of the invention disclosed therein has an annular mounting flange 21 compressively engaged between an annular seat 22 formed around the top of the coolant outlet 16 of the engine head 12 and the bottom flange 23 of the coolant outlet fitting 17. A gasket 24 is positioned between the engine head 12 and the bottom flange 23 of the coolant outlet fitting 17 to assure a fluid tight seal therebetween when the coolant fitting is secured thereto by studs 25. The central portion of the annular mounting flange 21 is provided with an annular upwardly disposed collar 26 terminating at an upwardly facing valve seat 27. The collar 26 is preferably provided with a suitable seepage aperture 28 therethrough to permit slight circulation of coolant past the thermostatic valve 15 when closed whereby to assure sufficient circulation past the thermostatic valve 15 to enable it to be responsive to average coolant temperature increase throughout the engine block during the engine warm-up period after a cold start.

A power bellows generally designated by the numeral 30 is mounted concentrically in spaced relationship below the valve seat 27 and is supported by a plurality of straps 31 extending upwardly from the lower fixed head 32 thereof to the mounting flange 21, the said straps 31 being secured to the mounting flange 21 by such suitable means as staking. The power bellows 30 is preferably of any thin wall type having a suitable number of convolutions 33. The upper movable head 34 of the power bellows 30 has an upwardly disposed central stem 35 extending therefrom through which the said power bellows 30 is charged with a suitable amount of volatile liquid that will vaporize at a predetermined temperature and cause the said bellows to expand and move the upper fixed head thereof upwardly. When the said power bellows is suitably charged, the central stem 35 thereof is plugged by a suitable plug 36 which is preferably solder-sealed to prevent leakage. The upper end of the central stem 35 is preferably exteriorly threaded to receive a poppet type valve element 37 which seats concentrically on the valve seat 27 when the power bellows 30 is contracted by the temperature of the coolant at the coolant outlet 16 of the engine head 12 dropping below the temperature at which the power bellows is charged for expansion. A suitable spider 38 connected between the straps 31 through which the central stem 35 is telescoped is employed to maintain the said central stem 35 of the power bellows 30 in axial alignment at all times. The construction of the thermostatic valve 15 so far described is that of a normal uncompensated thermostatic valve.

The poppet type valve element 37 serves as the lower movable head of the compensating bellows generally designated by the numeral 40. The said compensating bellows 40 is preferably of a thin wall type having a suitable number of convolutions 41. The upper fixed head 42 of the said compensating bellows 40 has an upwardly disposed exteriorly threaded central stem 43 extending through an aperture 44 in an inwardly disposed boss 170 formed in the coolant outlet fitting 17 centrally above the coolant outlet 16 of the cylinder head 12. The said central stem 43 of the compensating bellows 40 has an axial bore 430 therethrough of sufficient size to telescopingly accommodate a pressure rod 45 with sufficient clearance therearound to vent the interior of the bellows 40 to atmosphere outside the coolant outlet fitting 17. The upper fixed head 42 of the said compensating bellows 40 is rigidly secured to the coolant outlet fitting 17 by a clamp nut 46 threaded on the exteriorly threaded stem 43 of the compensating bellows 40. Suitable gaskets or washers 47 and 48 are provided around the said stem 43 above and below the boss 170 of the coolant outlet fitting 17 to prevent leakage of coolant from the said coolant outlet fitting 17.

The pressure rod 45 is in axial alignment with the center of the power bellows 30 and the lower end thereof contacts the axial center of the central stem 35 of the power bellows 30 as shown in Fig. 2 and is thereby in position to oppose opening movement of the valve. The top of the said pressure rod 45 is provided with a seat 49 onto which a compression type pressure spring 50 is seated. In the illustrative embodiment of the invention disclosed in the drawing, the clamp nut 46 is provided with an upwardly disposed sleeve 51 over which a pressure adjusting cap 52 is telescoped, the said sleeve 51 and adjusting cap 52 serving as a retainer and guide for the said pressure spring 50. The pressure cap 52 is provided with a suitable aperture 53 therein to assure the venting of the compensating bellows 40 to atmosphere. In the embodiment of the invention shown in Figs. 2, 3 and 4, the spring guide sleeve 51 is formed with a pair of oppositely disposed outwardly extending ears or tabs 54 with which the bayonet slots 55 in the pressure adjusting cap 52 cooperate, the said bayonet slots 55 having upper and lower lands 56 and 57 marked W and S respectively to indicate to which position the pressure adjusting cap 52 is set for winter or summer driving.

The sleeve 51 with its tabs 54 thereby constitutes means for maintaining the cap 52 to secure a selected loading of the spring 50.

When the pressure adjusting cap 52 is set to the S or summer driving position the spring pressure of the pressure spring 50 is substantially zero, and the thermostatic valve 15 functions as a fully compensated valve in a pressurized cooling system. If the cooling system into which the thermostatic valve 15 is installed is not pressurized, the upper compensating element 40 always functions as a seal to prevent coolant from being pumped out of the coolant outlet fitting 17 through the aperture 43 in the inwardly disposed boss 170 thereof. For example, if the power bellows 30 of the thermostatic valve 15 were charged to function at a start-to-open temperature of 151 degrees F. with the pressure spring 50 unloaded and with the pressure adjusting cap set in the S or summer position, the thermostatic valve 15 would open at 151 degrees F. whether the cooling system were pressurized or unpressurized. For cold weather or winter driving, the pressure spring 50 would be loaded by setting the adjusting cap to the W or winter position to apply sufficient pressure to cause the thermostatic valve 15 to open at a higher start-to-open temperature, say, 165 degrees F., and, the result would be equivalent to operating an unpressurized cooling system with an uncompensated thermostatic valve of a higher start-to-open temperature. Obviously, whether the cooling system is pressurized or not, the pressure added to the seating of the valve element 37 through the pressure rod 45 and pressure spring 50 causes the thermostatic valve 15 to operate at a correspondingly higher start-to-open temperature when the pressure adjusting cap 52 is set to W or winter driving position.

It will be noted that thermostatic valves embodying the invention may be easily and readily adapted for summer and winter engine and heater operation conditions, also, by merely using pressure springs 50 of different compressibility and by changing the adjustment thereof by employing selected pressure adjusting caps 52 having different land locations, a wide range of operation of thermostats embodying the invention can be accomplished.

Although but a single embodiment of the invention has been disclosed and described in detail, it is obvious that many changes may be made in the size, shape, arrangement and detail of the various elements thereof without departing from the spirit and scope of the invention as defined by the appended claims.

We claim:

1. An adjustable thermostat comprising a coolant fitting, a valve seat and a valve element seatable thereon arranged to control coolant flow through said fitting, a power bellows and a compensating bellows operatively associated with said valve element, a hollow stem extending through a wall of said fitting and axially from said compensating bellows venting the same to atmosphere, a pressure rod slidably extending through said hollow stem and compensating bellows with one end operatively connected with the said valve element, a cap vented to atmosphere arranged axially to receive the other end of said pressure rod, a spring under compression in said cap adapted to apply closing pressure on said valve element through said pressure rod whereby to cause the said power bellows to unseat said valve element at a higher temperature than that for which it is charged, and means associated with said cap for retaining the latter in predetermined positions with relation to said fitting.

2. An adjustable thermostat for controlling the flow of fluid through a circulatory system, said thermostat comprising a coolant fitting provided with a cooperating valve member and valve seat, a power bellows operatively associated with the said valve member, a pressure rod in mechanical connection with said valve member and extending into a passage leading to the atmosphere through a wall of said coolant fitting, means for sealing said rod from contact with the coolant space in said fitting, a spring abutting the outwardly extending end of said pressure rod, a cap confining said spring and arranged to be moved manually to compress and release the latter, and means for maintaining said cap in a selected position with respect to said fitting to determine the loading of said spring.

3. An adjustable thermostat comprising a coolant fitting provided with a cooperating valve member and valve seat, a power bellows operatively associated with the said valve member, a pressure rod with one end abutting the said valve member and arranged to urge it into closed position on said seat, the other end of said rod extending outwardly into a passage leading to the atmosphere through a wall of said fitting, a coil spring with one end acting on said other end of said rod, a cap confining said spring, and means for maintaining the said cap in more than one position with respect to said fitting for selected loading of said spring.

4. An adjustable thermostat comprising the combination of a valve and valve seat, a power bellows and a pressure compensating bellows operatively associated with said valve, a hollow stem for supporting said pressure compensating bellows and extending axially therefrom to vent the same to atmosphere, means for opposing opening movement of said valve, said opposing means extending through said hollow stem, a coiled spring acting against said opposing means to energize the latter, a cap enclosing said spring, a support for said cap, and means for adjustably positioning the said cap with respect to its support to determine the loading of said spring.

5. An adjustable thermostat comprising a coolant fitting, a valve, a seat for said valve in said fitting, means expansible by temperature variation for actuating said valve in one direction and with relation to said seat, spring operated means including a coil spring arranged to oppose the actuating of said valve by said expansible means, an apertured and axially slidable cap wholly outside said fitting and enclosing said spring and arranged for adjusting said spring operated means, means for supporting said cap for slidable movement to effect said adjustment, interlocking means on said support and cap for holding the latter in adjusted position, said interlocking means comprising a lug or supporting means for said cap and a bayonet slot in said cap receiving said lug whereby said cap may be axially moved on said supporting means and retained in adjusted position by coaction of said lug and the walls of said bayonet slot disposed at the opposite ends of the latter.

References Cited in the file of this patent

UNITED STATES PATENTS

| | | |
|---|---|---|
| 1,185,347 | Roller | May 30, 1916 |
| 1,355,250 | O'Donnell | Oct. 12, 1920 |
| 1,840,968 | Miller | Jan. 12, 1932 |
| 1,845,882 | Litschge | Feb. 16, 1932 |
| 1,846,698 | Trane | Feb. 23, 1932 |
| 1,847,911 | Trane | Mar. 1, 1932 |
| 1,925,530 | Gotthardt | Sept. 5, 1933 |
| 1,945,745 | Jauvert | Feb. 6, 1934 |
| 1,952,198 | Findley | Mar. 27, 1934 |
| 2,300,899 | Andersson | Nov. 3, 1942 |

FOREIGN PATENTS

| | | |
|---|---|---|
| 277,438 | Great Britain | Sept. 19, 1927 |
| 337,425 | Great Britain | Apr. 30, 1930 |